United States Patent
Kosaka

(10) Patent No.: US 7,025,410 B2
(45) Date of Patent: Apr. 11, 2006

(54) VEHICLE FRONT STRUCTURE, ACTIVATION CONTROLLER FOR OCCUPANT PROTECTION APPARATUS, AND METHOD OF PRODUCTION OF VEHICLE FRONT STRUCTURE

(75) Inventor: Naoya Kosaka, Susono (JP)

(73) Assignee: Toyota Jidosha Kabushiki Kaisha, (JP)

( * ) Notice: Subject to any disclaimer, the term of this patent is extended or adjusted under 35 U.S.C. 154(b) by 0 days.

(21) Appl. No.: 10/838,260

(22) Filed: May 5, 2004

(65) Prior Publication Data

US 2004/0239149 A1    Dec. 2, 2004

(30) Foreign Application Priority Data

May 12, 2003  (JP) ............................ P2003-133619

(51) Int. Cl.
 *B62D 25/08*   (2006.01)
(52) U.S. Cl. ............................. 296/187.09; 296/203.02
(58) Field of Classification Search ........... 296/203.01, 296/203.02, 187.03, 187.09
 See application file for complete search history.

(56) References Cited

U.S. PATENT DOCUMENTS 6,578,904 B1 *  6/2003  Yvetot et al. ............... 293/133
6,736,448 B1 *  5/2004  Hanakawa et al. ..... 296/187.09

2003/0075951 A1    4/2003  Hanakawa et al.

FOREIGN PATENT DOCUMENTS

| EP | 1 332 949 A2 | 8/2003 |
|---|---|---|
| JP | 2002-2528 | 1/2002 |
| JP | 2003-165462 | 6/2003 |

OTHER PUBLICATIONS

Patent Abstracts of Japan, JP 2003 072585 A, dated Dec. 3, 2003 of Miyasaka Hiroyuki.
European Search Report dated Oct. 14, 2004.

* cited by examiner

*Primary Examiner*—Dennis H. Pedder
(74) *Attorney, Agent, or Firm*—Finnegan, Henderson, Farabow, Garrett & Dunner, L.L.P.

(57) ABSTRACT

A vehicle front structure of the present invention has a pair of side members longitudinally located on right and left sides of a vehicle, and a pair of sub side members juxtaposed to the respective side members and adapted to receive a impact load in the event of a frontal collision after the side members receive the impact load. In this vehicle front structure, the side members first receive the impact load and then the sub side members juxtaposed to the side members also receive the impact load after a certain interval, in collaboration with the side members. Therefore, vehicle deceleration increases in two stages. Since the vehicle front structure has such sub side members, the magnitude of deceleration in the second stage upon collision can be made greater than that in the first stage, and it becomes feasible to make a decision on activation of occupant protection apparatus well.

10 Claims, 9 Drawing Sheets

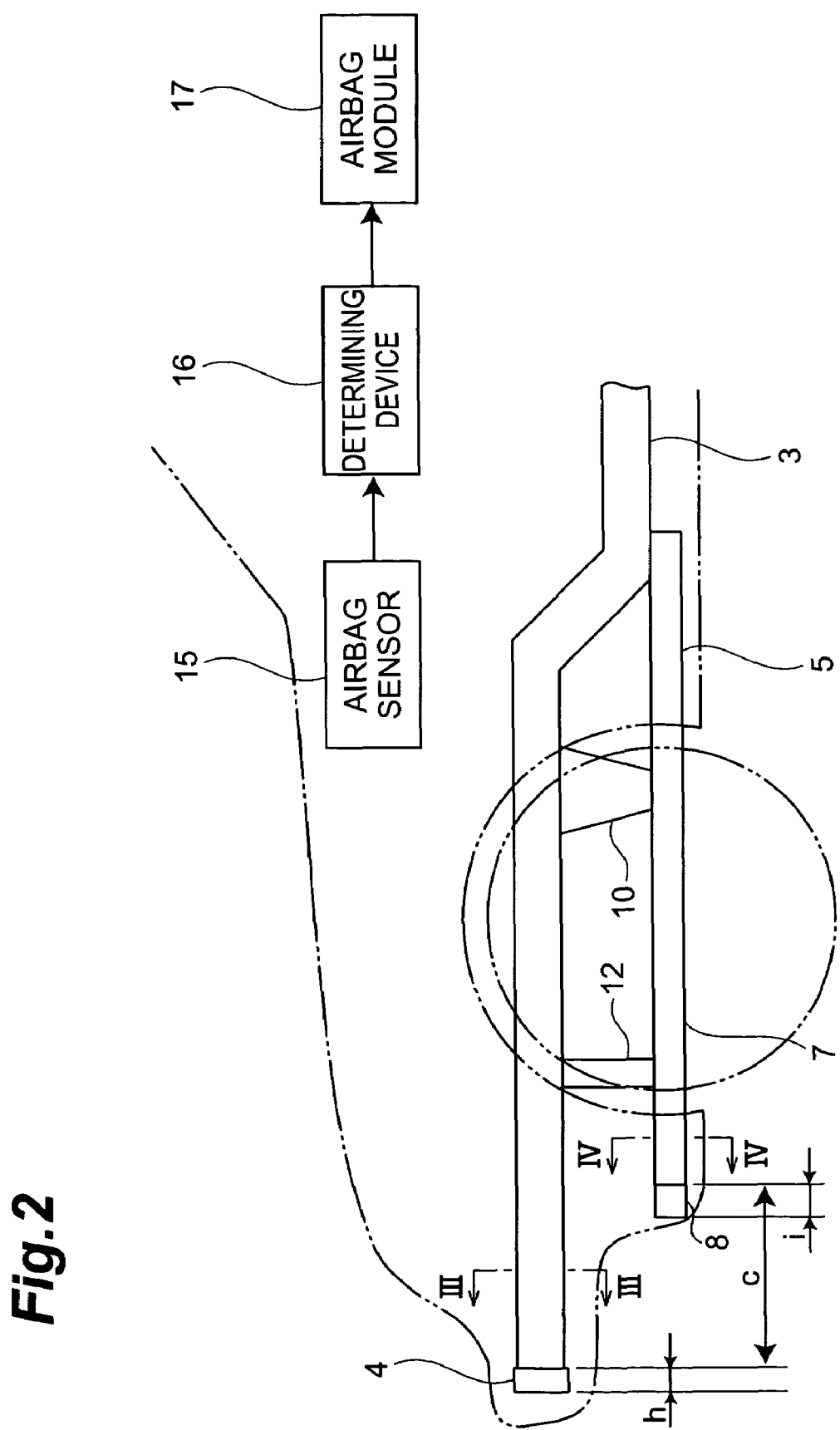

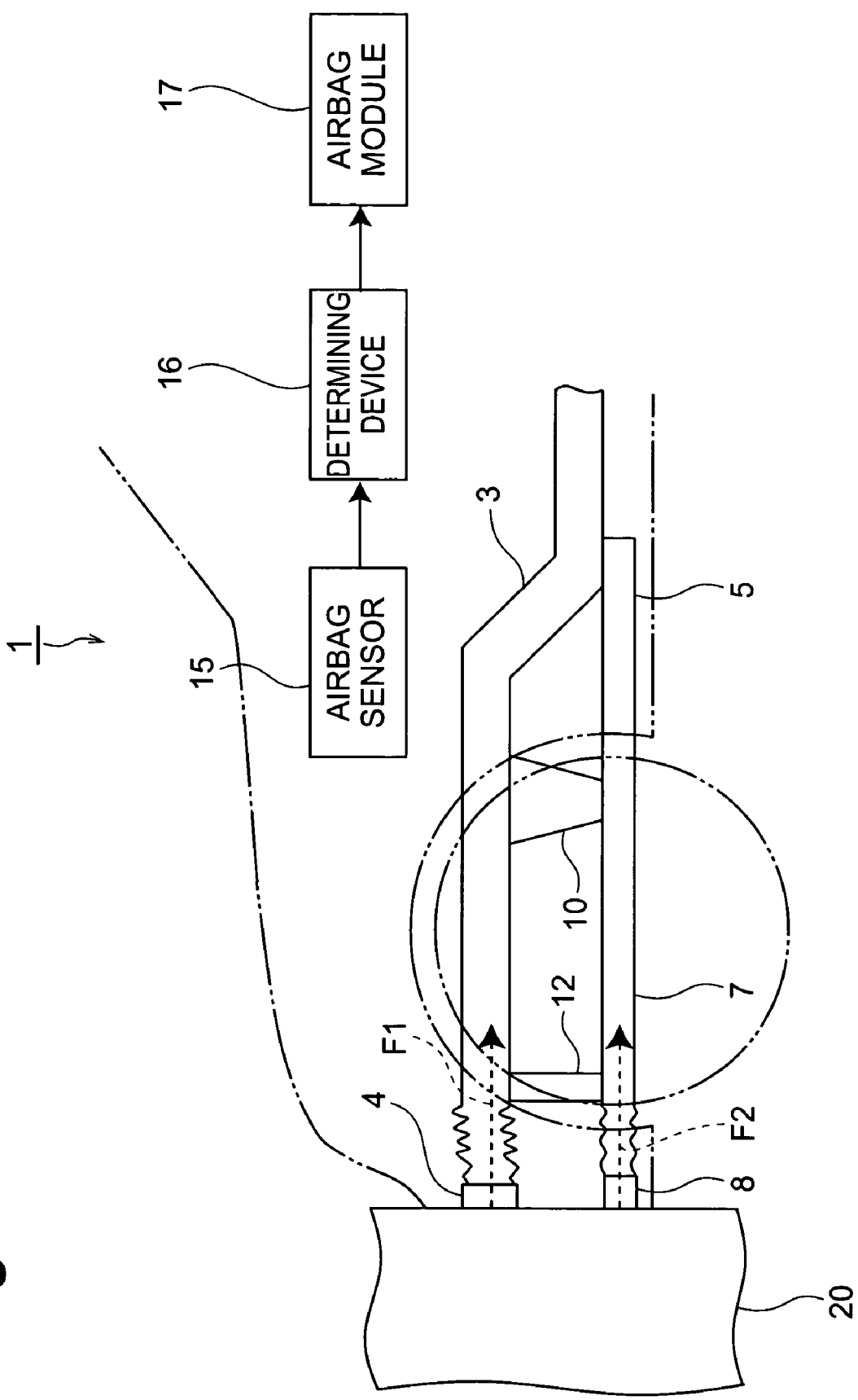

VEHICLE FRONT STRUCTURE, ACTIVATION CONTROLLER FOR OCCUPANT PROTECTION APPARATUS, AND METHOD OF PRODUCTION OF VEHICLE FRONT STRUCTURE

BACKGROUND OF THE INVENTION

1. Field of the Invention

The present invention relates to a vehicle front structure, an activation controller for occupant protection apparatus, and a method of production of the vehicle front structure.

2. Related Background Art

In these years, there is a known vehicle front structure in which a bumper reinforcement (hereinafter referred to as a bumper R/F) is supported at the front ends of side members located on right and left sides of a vehicle and in which, in the event that the vehicle collides with an obstacle at the bumper R/F first, the side members will undergo compressive deformation to absorb the impact.

For example, Japanese Patent Application Laid-Open No. 2002-2528 discloses a body structure for absorbing the impact by deformation of the side members. In this body structure, a chassis cross member extending laterally is provided below the right and left front side members. Connections between arms extending upward from the chassis cross member, and the front side members are arranged as separable in the event of collision, so as to properly deform the front side members.

On the other hand, more and more vehicles are being equipped with occupant protection apparatus such as airbags in recent years. When such a vehicle runs into an obstacle at high speed, i.e., when the deceleration of the vehicle exceeds a certain preset level, the occupant protection apparatus is activated to protect occupants.

FIG. 8A and FIG. 8B show an example of graphs showing temporal changes of deceleration (negative acceleration) of a vehicle. FIG. 8A shows the vehicle deceleration upon a collision at low speed, and FIG. 8B the vehicle deceleration upon a collision at high speed. An activation determination method for the occupant protection apparatus is, for example, a method of setting a determination area A in the graphs shown in FIGS. 8A and 8B and activating the occupant protection apparatus when the deceleration reaches the determination area A.

SUMMARY OF THE INVENTION

In order to determine more accurately whether the activation of the occupant protection apparatus is necessary, it is preferable to adopt such a vehicle structure that, after an increase of the deceleration in the initial stage (first stage $P_1$), the deceleration further increases in the next stage (second stage $P_2$), as shown in FIGS. 8A and 8B, and to make a decision on the activation of the occupant protection apparatus, based on the magnitude and time of the deceleration in the second stage $P_2$. However, the body structure disclosed in the aforementioned Japanese Patent Application fails to involve consideration to this point.

The present invention has been accomplished in order to solve the above problem and an object of the invention is to provide a vehicle front structure that makes it feasible to make a decision on activation of occupant protection apparatus well, and a method of production of the vehicle front structure. Another object of the present invention is to provide an activation controller for occupant protection apparatus capable of accurately determining whether activation of the occupant protection apparatus is necessary, by utilizing the vehicle front structure.

A vehicle front structure according to the present invention is characterized by comprising a pair of side members longitudinally located on right and left sides of a vehicle; and a pair of sub side members juxtaposed to the respective side members and adapted to receive a impact load in the event of a frontal collision after the side members receive the impact load. In this vehicle front structure, the side members first receive the impact load and then the sub side members juxtaposed to the side members also receive the impact load after a certain interval, in collaboration with the side members. Therefore, the vehicle deceleration increases in two stages. Since the vehicle front structure comprises such sub side members, the magnitude of the deceleration in the second stage upon collision can be made greater than that in the first stage, whereby it becomes feasible to make a decision on the activation of the occupant protection apparatus well.

Preferably, the sub side members are located below the side members. In this configuration, the sub side members can be located without largely affecting the contour of the vehicle. In this case, preferably, each sub side member is supported by a support member extending downward from the each side member. Furthermore, preferably, a portion going into contact with an obstacle upon a collision of the pair of sub side members is located ahead of the support member.

Preferably, front ends of the pair of side members are located ahead of front ends of the pair of sub side members. In this configuration, it is feasible to suitably realize the structure in which the sub side members receive the impact load after the side members receive the impact load.

Preferably, the front ends of the pair of side members are located a predetermined distance c ahead of the front ends of the pair of sub side members. This predetermined distance c is set based on a long-side length d and a short-side length e in a rectangular section of the side members and a long-side length f and a short-side length g in a rectangular section of the sub side members. In this case, more preferably, a bumper reinforcement with a longitudinal width h is attached to the front ends of the pair of side members and a cross member with a longitudinal width i is attached to the front ends of the pair of sub side members, and the predetermined distance c is represented by Eq (i) below:

$$c = k\left\{\frac{5}{8}(d+e) - \frac{1}{8}(f+g)\right\} - h + i,\ 0.5 \le k \le 2. \tag{i}$$

In contraction of the side members and the sub side members upon collision of the vehicle, a contraction distance with a maximum (local maximum) impact load on each of the side members and the sub side members is correlated with the long-side length and the short-side length in the rectangular section of each of the side members and the sub side members. In the above-described vehicle front structure, therefore, the impact load on the sub side members has a first maximum substantially at the same time as a second maximum of the impact load on the side members, and it is thus easy to set the magnitude of the vehicle deceleration in the second stage upon collision greater than that in the first stage. This makes it feasible to make a decision on the activation of the occupant protection apparatus better.

Preferably, a strength $F_0$ of the side members and a strength $F_+$ of the sub side members satisfy the following relational expression (ii), using an error range $\pm a$ % of deceleration detecting means for detecting the deceleration of the vehicle and a distribution range $\pm b$ % of decelerations among different vehicle types against an identical impact load:

$$\frac{F_+}{F_0} \geq \left(1 + \frac{a}{100}\right)^2 \left(1 + \frac{b}{100}\right)^2 - 1. \quad \text{(ii)}$$

In this configuration, even if the deceleration detecting means has error and even if the vehicle deceleration upon collision differs among vehicle types upon an identical collision, the magnitude of the deceleration in the second stage of the vehicle can be made greater than that in the first stage, whereby it is feasible to make a decision on the activation of the occupant protection apparatus better.

An activation controller for occupant protection apparatus according to the present invention is set in a vehicle with the vehicle front structure described above, and the activation controller comprises: deceleration detecting means for detecting a deceleration of the vehicle; and activation determining means for determining activation of the vehicle protection apparatus, based on the deceleration of the vehicle detected by the deceleration detecting means. In this activation controller for occupant protection apparatus, the activation determining means is able to accurately determine the timing of activation of the occupant protection apparatus, based on the magnitude of the deceleration of the vehicle in the second stage detected by the deceleration detecting means.

A method of producing a front structure of a vehicle according to the present invention is a method of production of a vehicle front structure in a vehicle comprising a pair of side members longitudinally located on right and left sides of the vehicle and a pair of sub side members juxtaposed to the respective side members, the method comprising a step of determining a location of front ends of the sub side members relative to front ends of the side members, based on a change of vehicle deceleration due to deformation of the side members and a change of vehicle deceleration due to deformation of the sub side members in the event of a frontal collision of the vehicle. Furthermore, preferably, the location of the front ends of the sub side members relative to a location of the front ends of the side members is determined so that a timing of a second maximum of the vehicle deceleration due to the deformation of the side members overlaps with a timing of a first maximum of the vehicle deceleration due to the deformation of the sub side members. This production method of the vehicle front structure can readily substantiate the vehicle front structure in which the magnitude of the vehicle deceleration in the second stage upon the frontal collision of the vehicle is greater than that in the first stage.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a side view from the left side of the vehicle front structure shown in FIG. 1.

FIG. 5 is a side view showing a state in which a vehicle is running into an obstacle and in which an impact load is being exerted on the left side member and on the left sub side member.

DESCRIPTION OF THE PREFERRED EMBODIMENTS

Figure 1:
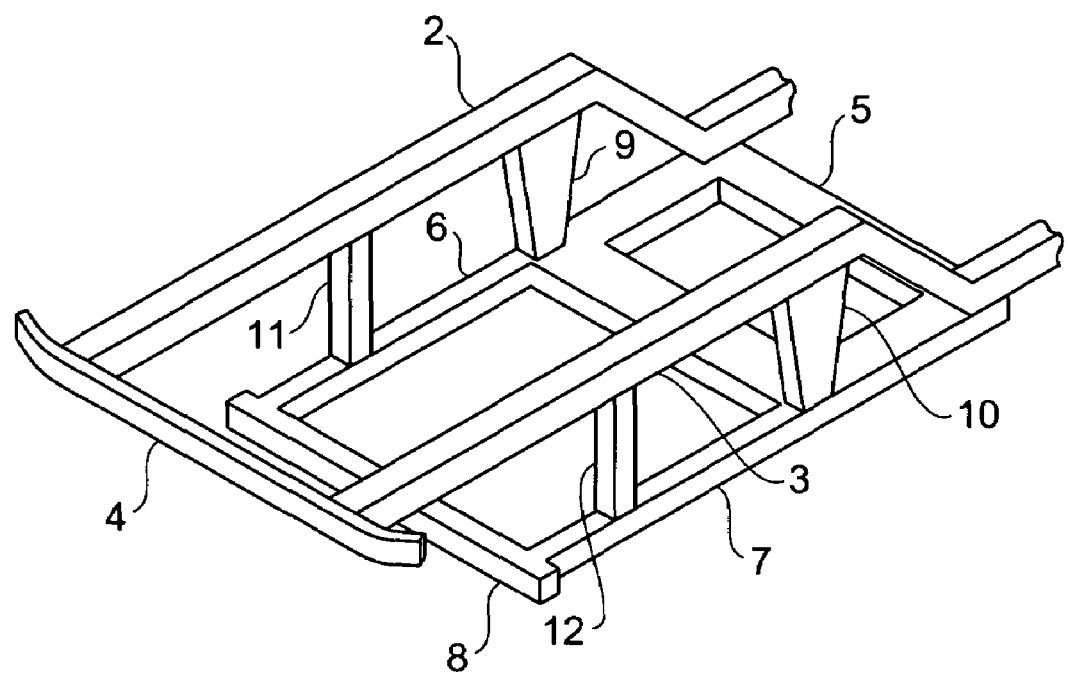
FIG. 1 is a perspective view showing an embodiment of the vehicle front structure according to the present invention.

Preferred embodiments of the vehicle front structure, the activation controller for occupant protection apparatus, and the production method of the vehicle front structure according to the present invention will be described below with reference to the drawings. The same elements will be denoted by the same reference symbols in the description of the drawings, without redundant description. It is also noted that the dimensional ratios in the drawings do not always agree with those in the description.

FIG. 1 is a perspective view showing an embodiment of the vehicle front structure according to the present invention. FIG. 2 is a side view from the left side of the vehicle front structure shown in FIG. 1. As shown in FIG. 1 and FIG. 2, vehicle 1 is provided with a left side member 3 and a right side member 2. The left side member 3 is located in the longitudinal direction on the front left side of vehicle 1. The right side member 2 is located in the longitudinal direction on the front right side of vehicle 1.

The vehicle 1 is also provided with a bumper R/F 4. The bumper R/F 4 is disposed in the lateral direction of the vehicle 1. The bumper R/F 4 is fixed near each end thereof to the front ends of the right side member 2 and the left side member 3.

The vehicle 1 has a sub frame 5. The sub frame 5 is located below the right side member 2 and the left side member 3, the left front end of the sub frame 5 is fixed to the left side member 3 by coupling member 10, and the right front end of the sub frame 5 is fixed to the right side member 2 by coupling member 9. The left rear end of the sub frame 5 is directly fixed to the left side member 3, and the right rear end of the sub frame 5 directly to the right side member 2. An engine and other components of vehicle 1 are mounted on the sub frame 5.

The vehicle 1 is provided with a left sub side member 7 and a right sub side member 6. The left sub side member 7 is juxtaposed to the left side member 3. The left sub side member 7 extends nearly in parallel with the left side member 3 from the left front end of sub frame 5 toward the front of the vehicle 1, and is supported by a columnar pillar (support member) 12 extending downward from the left side member 3. The front end of the left sub side member 7, which is a portion going into contact with an obstacle upon a collision with the obstacle, is located a predetermined distance c behind the front end of the left side member 3. The front end of the left sub side member 7 is located ahead of the pillar 12. In this configuration, in the event of a frontal collision, only the left side member 3 first receives an impact load and then the left sub side member 7 receives the impact load, in collaboration with the left side member 3.

The right sub side member 6 is juxtaposed to the right side member 2. The right sub side member 6 extends nearly in parallel with the right side member 2 from the right front end of sub frame 5 toward the front of the vehicle 1 and is supported by a columnar pillar (support member) 11 extending downward from the right side member 2. Just as in the case of the left sub side member 7, the front end of the right sub side member 6 is located the predetermined distance c behind the front end of the right side member 2. The front end of the right sub side member 6 is located ahead of the pillar 11.

The vehicle 1 has a cross member 8. The cross member 8 is disposed in the lateral direction of the vehicle 1. The cross member 8 is fixed near each end to the front ends of the right sub side member 6 and the left sub side member 7.

Figure 3A:
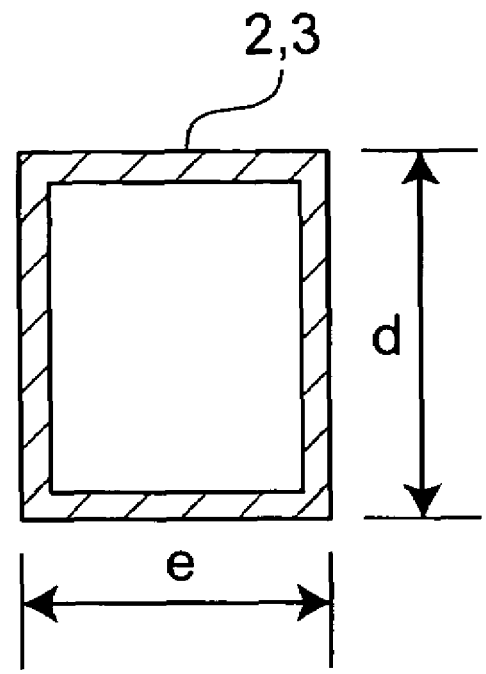
FIG. 3A is a sectional view along line III—III in FIG. 2.
Figure 3B:
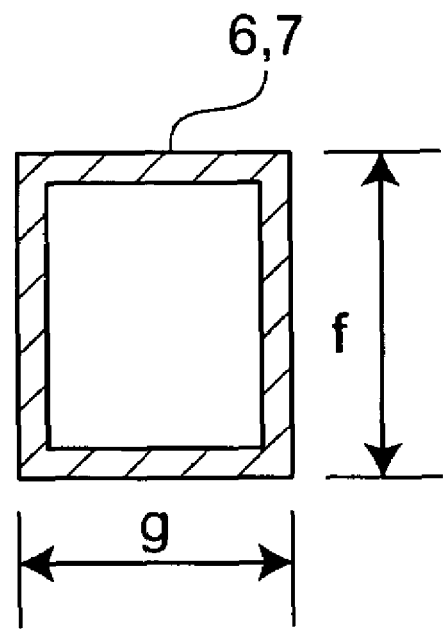
FIG. 3B is a sectional view along line IV—IV in FIG. 2.

FIG. 3A is a sectional view of the left side member 3 (a cross section along line III—III in FIG. 2). FIG. 3B is a sectional view of the left sub side member 7 (a cross section along line IV—IV in FIG. 2). As shown in FIGS. 3A and 3B, the left side member 3 and the left sub side member 7 are of columnar shape having a rectangular section, the inside of which is hollow. The right side member 2 and the right sub side member 6 are also of the same shape as the left side member 3 and the left sub side member 7.

As shown in FIG. 2, the vehicle 1 is provided with an airbag sensor 15, a determining device 16, and an airbag module 17. The airbag module 17 internally incorporates an airbag, and an inflator for generating a gas to inflate the airbag, and is an occupant protection apparatus for protecting an occupant in the event of collision. The airbag sensor 15 is a deceleration detecting means for detecting the deceleration of vehicle 1. The airbag sensor 15 detects the deceleration of vehicle 1 during normal drives and sends a signal indicating the magnitude of deceleration to the determining device 16.

The determining device 16 is an activation determining means for determining actuation of the airbag device, based on the deceleration of vehicle 1 detected by the airbag sensor 15. The determining device 16 is an ECU (Electric Control Unit) and is constructed as internally incorporating a CPU, a ROM, a RAM, and so on. The ROM stores an actuation determination program and others. The airbag sensor 15 and the determining device 16 constitute an activation controller for actuating the airbag device (inflating the airbag). The determining device 16 decides to actuate the airbag device when the deceleration of vehicle 1 from the airbag sensor 15 reaches a predetermined magnitude within a given time. The determining device 16 actuates the airbag device, for example, by feeding a signal for actuation of the airbag device to the airbag module 17.

Figure 4:
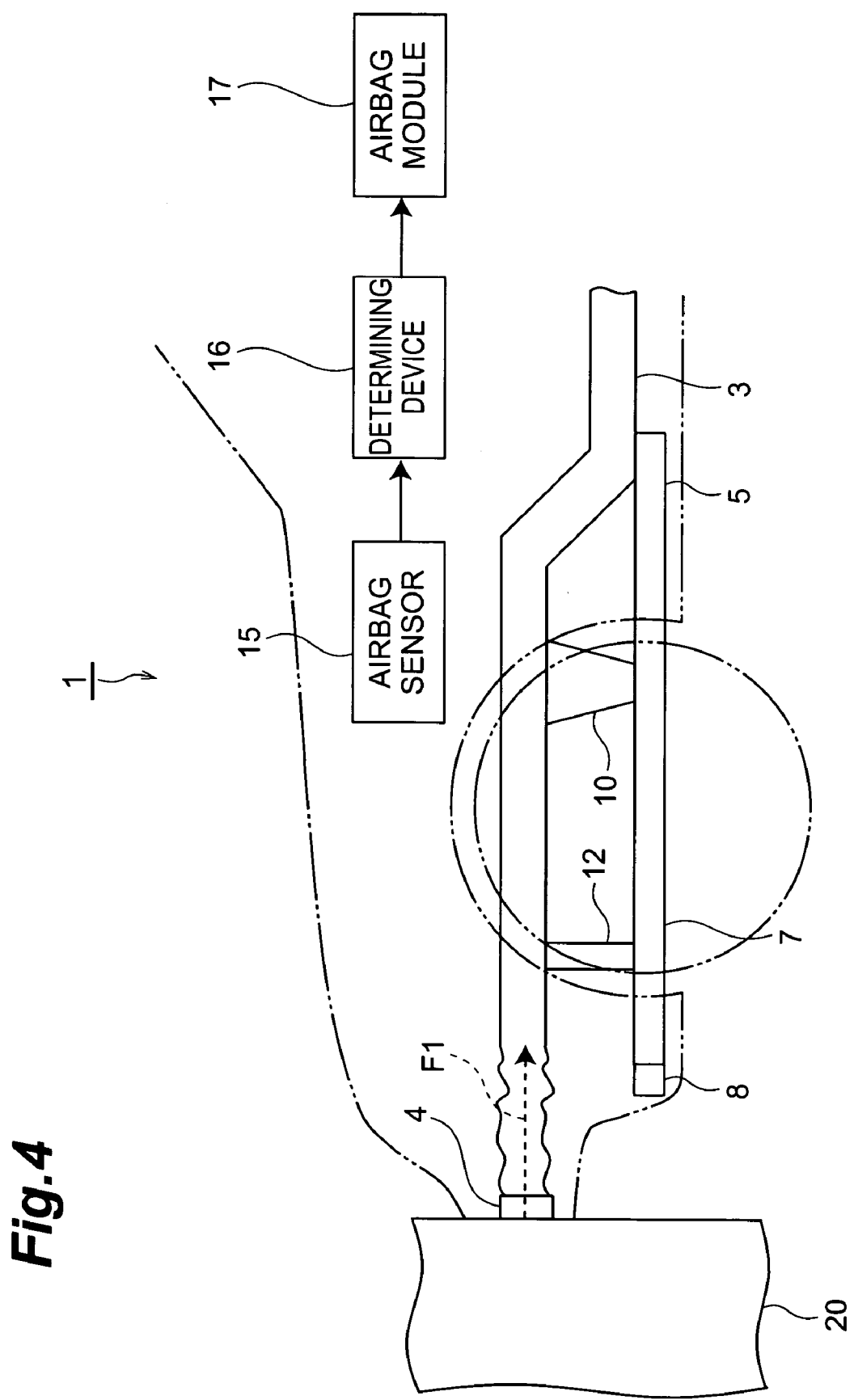
FIG. 4 is a side view showing a state in which a vehicle is running into an obstacle and in which an impact load is being exerted on the left side member.

Now, behaviors of the above-described vehicle front structure will be described with reference to FIGS. 4 and 5. FIG. 4 is a side view showing a state in which the vehicle 1 in the present embodiment is running into an obstacle 20 and in which an impact load is being applied to the left side member 3. FIG. 5 is a side view showing a state in which the vehicle 1 is running into the obstacle 20 and in which an impact load is being applied to the left side member 3 and to the left sub side member 7. The description below will concern behaviors of the respective members on the left side in the vehicle front structure, but the members on the right side also demonstrate behaviors similar to those on the left side in the event of a full lap collision. Although the left side of the vehicle will be described as an example, as is also the case in the description of the production method of the vehicle front structure and others given later, the same also applies to the right side.

As the vehicle 1 is running into obstacle 20, the bumper R/F 4 first receives an impact load F1 as shown in FIG. 4. At this time, since a buckling strength (buckling load) of the bumper R/F 4 is higher than an axial collapse strength (axial collapse load) of the left side member 3, the impact load F1 is transferred to the left side member 3, whereby the left side member 3 is deformed near the front end to contract. At this time, the left sub side member 7 is not subjected to any impact load yet.

Subsequently, when the left side member 3 contracts by the predetermined distance c (cf. FIG. 2), the cross member 8 also receives an impact load F2 as shown in FIG. 5. Since a buckling strength. (buckling load) of the cross member 8 is higher than an axial collapse strength (axial collapse load) of the left sub side member 7, the impact load F2 is transferred to the left sub side member 7, whereby the left sub side member 7 is deformed near the front end to contract.

Figure 6A:
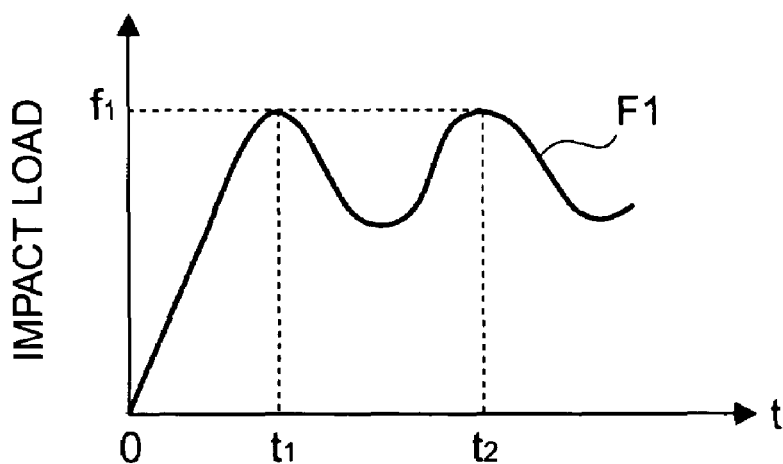
FIG. 6A is a graph showing an example of time change of the impact load exerted on the left side member upon the collision of the vehicle with the obstacle.
Figure 6B:
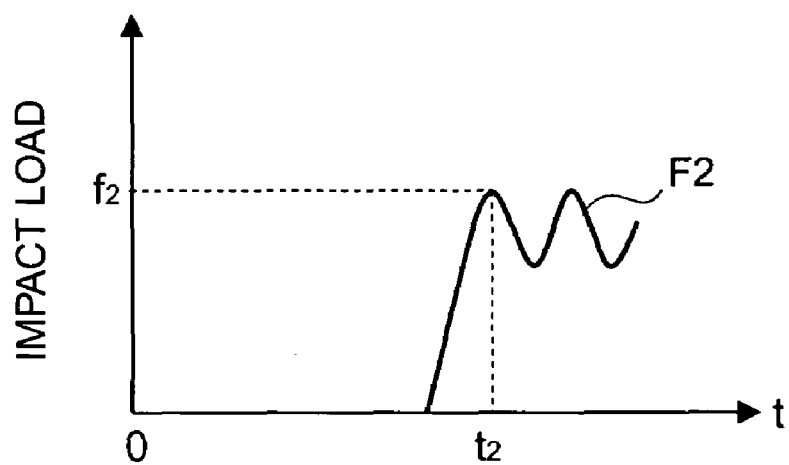
FIG. 6B is a graph showing an example of time change of the impact load exerted on the left sub side member upon the collision of the vehicle with the obstacle.
Figure 6C:
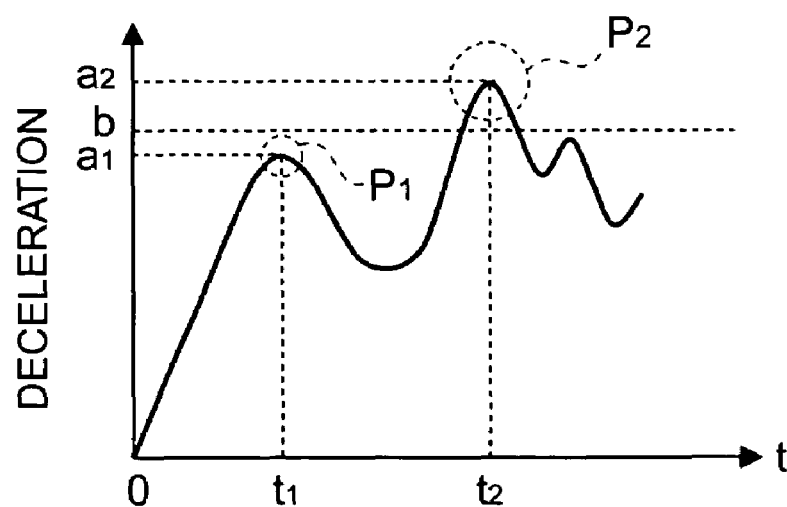
FIG. 6C is a graph showing a time change of vehicle deceleration resulting from application of the impact load to the left side member and application of the impact load to the left sub side member.

FIG. 6A is a graph showing an example of time change of the impact load F1 applied to the left side member 3 upon the collision of the vehicle 1 with the obstacle 20. FIG. 6B is a graph showing an example of time change of the impact load F2 applied to the left sub side member 7 upon the collision of the vehicle 1 with the obstacle 20. FIG. 6C is a graph showing a time change of deceleration of the vehicle 1.

As shown in FIG. 6A, the impact load F1 starts increasing immediately after a start of the collision (time $t=0$), and reaches a value $f_1$ according to the strength of the left side member 3 at a time $t=t_1$. When the impact load F1 reaches the value $f_1$, the left side member 3 starts being deformed. Thereafter, the impact load F1 repeats increases and decreases. In this case, a time $t=t_2$ is defined as a time when the impact load F1 has a second maximum. On the other hand, as shown in FIG. 6B, the impact load F2 starts increasing at a certain constant time after the start of the collision ($t=0$). The reason why the impact load F2 starts increasing after the lapse of the constant time is that the front end of the left sub side member 7 is located the predetermined distance c behind the front end of the left side member 3. When the impact load F2 reaches a value $f_2$ according to the strength of the left sub side member 7, the left sub side member 7 starts being deformed and thereafter the impact load F2 repeats increases and decreases.

As shown in FIGS. 6A and 6B, the time when the impact load F2 first reaches the value $f_2$ according to the strength of the left sub side member 7 coincides with the time ($t=t_2$) when the impact load F1 takes the second maximum. Since the time when the left sub side member 7 starts receiving the impact load F2 can be adjusted by the aforementioned predetermined distance c, properly setting the predetermined distance c enables us to achieve such adjustment that the time when the impact load F2 first reaches the value $f_2$ becomes $t_2$ as shown in FIG. 6B.

When the predetermined distance c is properly set in this way, the deceleration of the vehicle 1 varies as in the graph shown in FIG. 6C. As shown in FIG. 6C, the deceleration of vehicle 1 comes to have a first stage $P_1$ with a first maximum at the time $t_1$. The first stage $P_1$ corresponds to a phenomenon in which the impact load F1 applied to the left side member 3 first reaches the value $f_1$. Namely, since at the time $t_1$ the vehicle 1 receives $f_1$ as an impact load, the deceleration $a_1$ according to the value $f_1$ acts on the vehicle 1. Then the deceleration of vehicle 1 comes to have a second stage $P_2$ with a second maximum at the time $t_2$. The second stage $P_2$ corresponds to a phenomenon in which the impact load F1 applied to the left side member 3 again reaches $f_1$ and in which the impact load F2 applied to the left sub side member 7 first reaches the value $f_2$. Namely, since at the time $t_2$ the vehicle 1 receives $f_1+f_2$ as an impact load, the deceleration $a_2$ according to this value $f_1+f_2$ acts on the vehicle 1.

The deceleration $a_2$ of vehicle 1 at the time $t_2$ takes a value greater than the previously occurring deceleration $a_1$ by a degree of the impact load value $f_2$. Accordingly, the deceleration of vehicle 1 in the second stage $P_2$ takes a value greater than that in the first stage $P_1$. Then a deceleration as a criterion for the determination in the determining device 16 shown in FIG. 2 on whether the airbag device should be actuated is set to a value between $a_1$ and $a_2$ (e.g., a value b shown in FIG. 6C), whereby the determining device 16 can detect the second stage $P_2$ of deceleration. The determining device 16 actuates the airbag device when the second stage $P_2$ of deceleration occurs within a fixed period from a collision.

However, there can be a certain error range (dispersion) in sensitivity of airbag sensor 15 for detecting the deceleration of vehicle 1. In a group of vehicle types to which a common airbag actuation determination criterion is applied, the deceleration upon collision can also slightly differ among different vehicle types. On the other hand, the deceleration of vehicle 1 is determined according to the strengths of the left side member 3 and the left sub side member 7. In such cases, therefore, the strengths are set to satisfy Eq (1) below. This makes the magnitude of the deceleration of vehicle 1 in the second stage $P_2$ greater than that in the first stage $P_1$ even if the airbag sensor 15 has error and even if the deceleration differs among different vehicle types in an identical collision mode.

$$\frac{F_+}{F_0} \geq \left(1+\frac{a}{100}\right)^2\left(1+\frac{b}{100}\right)^2 - 1 \quad (1)$$

The symbols in Eq (1) above are defined as follows: an error range of the airbag sensor 15 is $\pm a$ %, a distribution range of deceleration among different vehicle types in an identical collision mode is $\pm b$ %, the strength (impact collapse load) of the left side member 3 is $F_0$, and the strength (impact collapse load) of the left sub side member 7 is $F_+$.

As described previously, in order to cause the deceleration as shown in FIG. 6C upon the collision of the vehicle 1 with the obstacle 20, it is preferable to properly set the predetermined distance c. For example, the following two methods can be applied as methods of setting this predetermined distance c.

Figure 7:
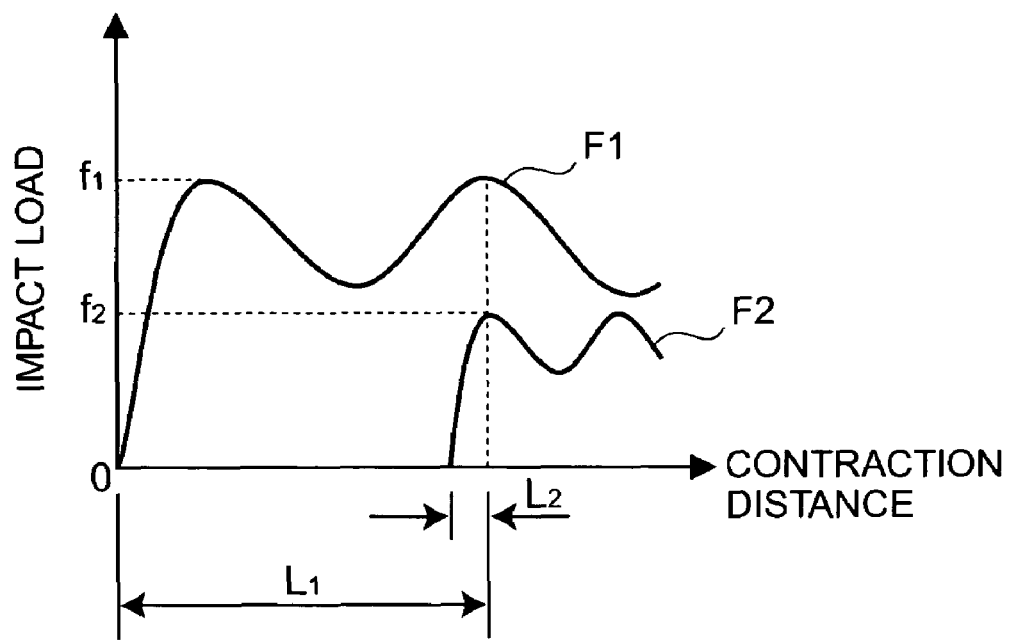
FIG. 7 is a graph showing the magnitudes of impact loads at a contraction distance in a case where the left side member and the left sub side member receive the respective impact loads to contract.
Figure 8A:
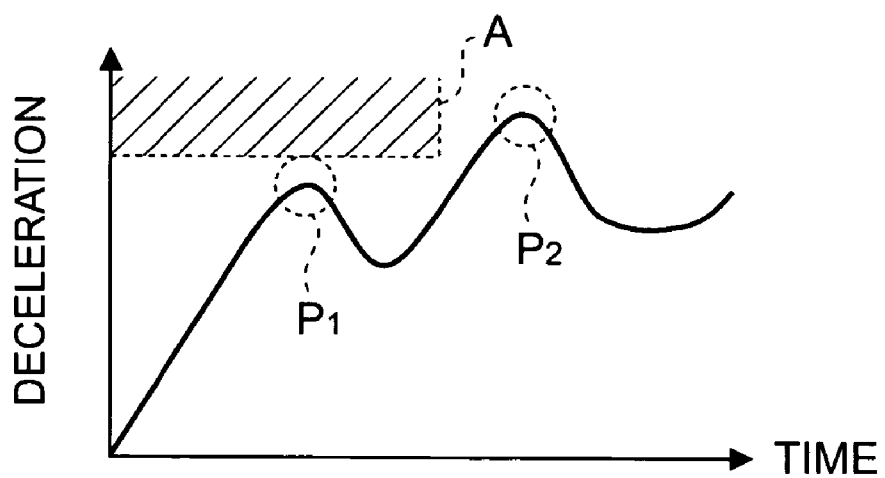
FIG. 8A is an example of a graph showing a time change of vehicle deceleration upon a collision at low speed.
Figure 8B:
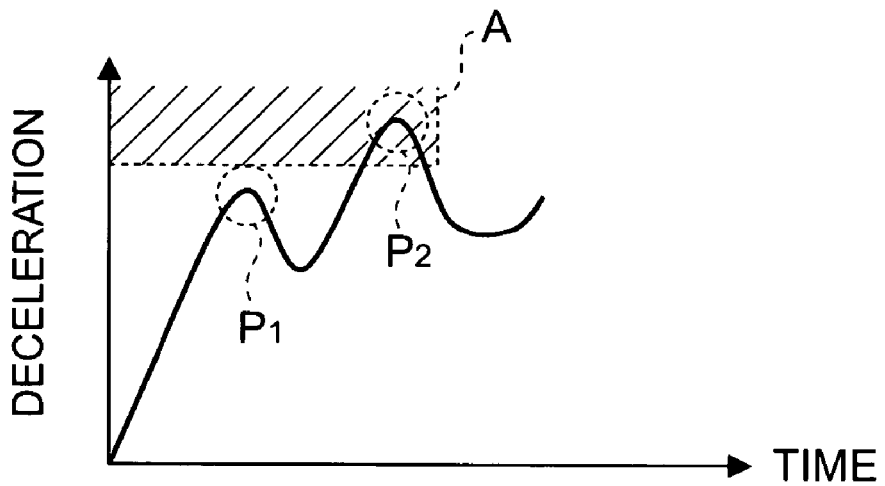
FIG. 8B is an example of a graph showing a time change of vehicle deceleration upon a collision at high speed.

The first method is a method of setting the predetermined distance c, based on a long-side length d and a short-side length e in the rectangular section of the left side member 3 (cf. FIG. 3A) and based on a long-side length f and a short-side length g in the rectangular section of the left sub side member 7 (cf. FIG. 3B). FIG. 7 is a graph showing a relation between contraction distance and impact load in a case where the left side member 3 and the left sub side member 7 contract under their respective impact loads F1 and F2. As shown in FIG. 7, the impact loads F1 and F2 both repeat increases and decreases (i.e., vibrate), after contraction (buckling) of the left side member 3 and the left sub side member 7.

$L_1$ in FIG. 7 represents a contraction distance of the left side member 3 at the second maximum of the impact load F1. When a buckling wavelength of the left side member 3 is represented by $D_1$, the distance $L_1$ is expressed by Eq (2) below.

$$L_1 = \frac{5}{4}D_1 \quad (2)$$

$L_2$ in FIG. 7 represents a contraction distance of the left sub side member 7 at the first maximum of the impact load F2. When the buckling wavelength of the left sub side member 7 is denoted by $D_2$, the distance $L_2$ is expressed by Eq (3) below.

$$L_2 = \frac{1}{4}D_2 \quad (3)$$

In a member with a cross section of rectangular shape, the buckling wavelength is given by an average of the long-side length and the short-side length of the rectangular section. Hence Eq (2) and Eq (3) above reduce to Eqs (4) and (5) below, respectively, using the long-side length d and the short-side length e of the left side member 3 (cf. FIG. 3A) and the long-side length f and the short-side length g of the left sub side member 7 (cf. FIG. 3B).

$$L_1 = \frac{5}{8}(d+e) \quad (4)$$

$$L_2 = \frac{1}{8}(f+g) \quad (5)$$

The long side of the rectangular section refers to the longer out of the width and height of the left side member 3 (left sub side member 7), and the short side to the other.

For making the magnitude of deceleration of vehicle 1 in the second stage $P_2$ greater than that in the first stage $P_1$ (cf. FIG. 6C), it suffices that the contraction position at the second maximum of the impact load F1 shown in FIG. 7 be made to substantially coincide with the contraction position at the first maximum of the impact load F2. Namely, all that is required is that the difference between the contraction distance $L_1$ of the left side member 3 and the contraction distance $L_2$ of the left sub side member 7 should be made to substantially coincide with the distance between the collision of the bumper R/F 4 with the obstacle and the collision of the cross member 8 with the obstacle. When the predetermined distance c satisfies Eq (6) below, the magnitude of the deceleration of vehicle 1 in the second stage $P_2$ becomes larger than that in the first stage $P_1$.

$$c+h-i=L_1-L_2 \qquad (6)$$

In Eq (6) above, h represents the longitudinal thickness of the bumper R/F 4, and i the longitudinal thickness of the cross member 8. By arranging Eq (6) above, we obtain Eq (7) below.

$$c = L_1 - L_2 - h + i = \frac{5}{8}(d+e) - \frac{1}{8}(f+g) - h + i \qquad (7)$$

However, the predetermined distance c does not have to precisely satisfy Eq (7). For example, where it satisfies Eq (8) below using a constant k ($0.5 \leq k \leq 2$), it is quite possible to make the magnitude of deceleration of vehicle 1 in the second stage $P_2$ greater than that in the first stage $P_1$.

$$c = k\left\{\frac{5}{8}(d+e) - \frac{1}{8}(f+g)\right\} - h + i \qquad (8)$$

When the predetermined distance c is set in this manner on the basis of the long-side length d and the short-side length e in the cross section of the left side member 3 (a section perpendicular to the axial direction of the member) and the long-side length f and the short-side length g in the cross section of the left sub side member 7, the magnitude of deceleration of vehicle 1 in the second stage $P_2$ can be readily made larger than that in the first stage $P_1$.

The second method is a method of setting the predetermined distance c, based on deceleration changes upon collision of the left side member 3 and the left sub side member 7. In this method, on the occasion of producing the vehicle front structure in the present embodiment, samples of the left side member 3 and the left sub side member 7 are prepared and signal waveforms indicating deceleration changes upon collision are acquired by experiment. Subsequently, based on the deceleration changes of the left side member 3 and the left sub side member 7, the predetermined distance c is set so that the timing of the second maximum of deceleration of the left side member 3 overlaps with the timing of the first maximum of deceleration of the left sub side member 7, thereby determining the relative location of the sub side member 7 to the left side member 3. The term "a timing overlaps with another timing" herein is not limited to a case where the two timings precisely coincide with each other, but it also involves a case where the two timings are approximately coincident with each other.

The vehicle front structure in the present embodiment has the following effects. Namely, in the vehicle front structure of the present embodiment, the side members 2, 3 first receive the impact load and then the sub side members 6, 7 juxtaposed to the side members 2, 3 also receive the impact load after a certain interval, in collaboration with the side members 2, 3. As a result, the deceleration of vehicle 1 increases in two stages of the first stage $P_1$ and the second stage $P_2$ in the early period of collision. When the vehicle 1 is equipped with the sub side members 6, 7 in this way, the magnitude of deceleration in the second stage $P_2$ upon collision becomes greater than that in the first stage $P_1$, whereby it becomes feasible to make a decision on actuation of the airbag device well.

Figure 9:
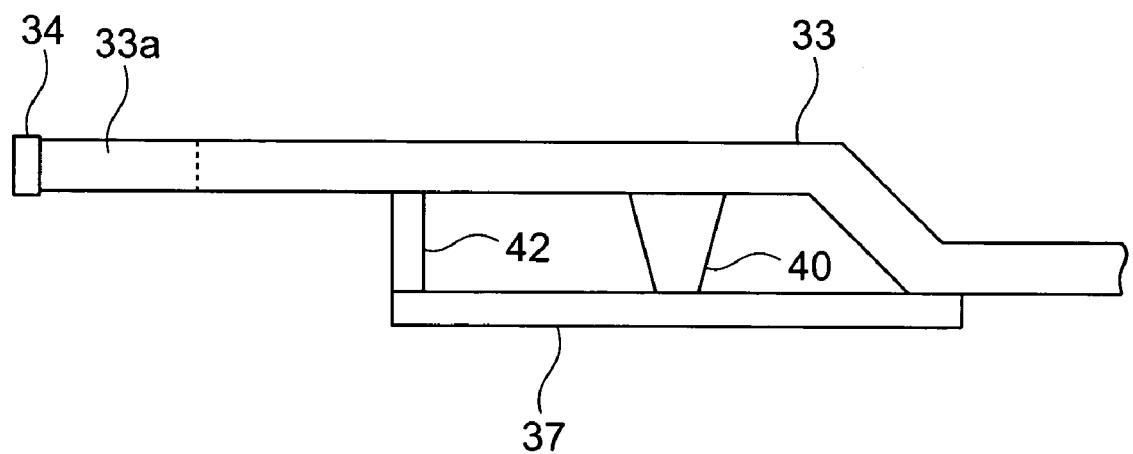
FIG. 9 is an illustration showing a comparative example of the vehicle front structure.

A vehicle front structure shown in FIG. 9 is a conceivable comparative example of the vehicle front structure to make the magnitude of deceleration in the second stage $P_2$ greater than that in the first stage $P_1$. FIG. 9 shows only the left side of the vehicle, but a similar structure is also constructed on the right side of the vehicle. In this vehicle front structure, a sub frame 37 is provided via coupling member 40 and pillar 42 below the side member 33. A bumper R/F 34 is attached to the distal end of the side member 33, and the bumper R/F 34 first receives an impact from the front of the vehicle. The side member 33 has a deformable zone 33a with relatively low rigidity near the front end thereof, and in the event of a collision of the vehicle with an obstacle, the deformable zone 33a is first deformed. Then the first stage $P_1$ of deceleration appears during deformation of the deformable zone 33a and then the second stage $P_2$ demonstrating the deceleration greater than in the first stage $P_1$ appears after an end of the deformation of the deformable zone 33a.

In the vehicle front structure shown in FIG. 9, however, a part of the side member 33 needs to be made as deformable zone 33a with low rigidity. For this reason, the crush stroke upon collision becomes longer by a degree of absorption of energy reduced by the deformable zone 33a, which increases the part that has to be repaired. In order to decrease the part that has to be repaired, it is possible to set the length of the deformable zone 33a a little longer so as to secure the amount of absorption of energy in the deformable zone 33a. However, this requires extension of the front overhang and will be subject to restrictions on outside dimensions of the vehicle. Alternatively, in order to keep the crush stroke short and to avoid the restrictions on the outside dimensions of the vehicle, it is also possible to increase the total strength of the side member 33 including the deformable zone 33a. However, the increase in the strength of the side member 33 requires a further increase of strength of the compartment zone, so as to largely increase the weight of the vehicle, which is not preferred.

In contrast to it, the vehicle front structure in the present embodiment does not need to secure the long crush stroke and does not increase the range that has to be repaired. Since it is unnecessary to increase the length of the side members 2, 3, there is little influence on the outside dimensions of the vehicle. Since it can absorb an equivalent or greater impact energy without need for increase in the strength of side members 2, 3, there is no need for reinforcement of the compartment zone, which is needed for increase in the strength of side members, and thus an increase in the weight of the vehicle can be minimized.

Since in the vehicle front structure of the present embodiment the side members 2, 3 and the sub side members 6, 7 receive the impact load, the impact load can be higher than in the case where the impact load is received by the side members 2, 3 only. Accordingly, the deceleration in the initial stage of collision becomes higher on one hand, and the deceleration in the latter half of collision is reduced on the other hand, which improves the occupant restraining performance.

In the vehicle front structure of the present embodiment, the sub side members 6, 7 are provided below the side members 2, 3. This permits the sub side members 6, 7 to be placed without largely affecting the contour of the vehicle 1.

In the vehicle front structure of the present embodiment, the front ends of the side members 2, 3 are located ahead of the sub side members 6, 7. This makes it feasible to suitably realize the configuration in which, in the event of the collision of the vehicle 1 with obstacle 20, the sub side members 6, 7 receive the impact load after the side members 2, 3 receive the impact load.

In the vehicle front structure of the present embodiment, the front ends of the side members. 2, 3 are located the predetermined distance c ahead of the front ends of the sub side members 6, 7. This predetermined distance c is set based on the long-side length d and the short-side length e in the rectangular section of the side members 2, 3 and the long-side length f and the short-side length g in the rectangular section of the sub side members 6, 7 as indicated by Eq (7) and Eq (8).

The contraction distance where the impact load F1 becomes maximum in contraction of the side members 2, 3 due to the collision of vehicle 1 is correlated with the long-side length d and the short-side length e in the rectangular section of side members 2, 3. The same also applies to the contraction distance where the impact load F2 becomes maximum in contraction of the sub side members 6, 7. Therefore, when the predetermined distance c is set as described above, the impact load F2 on the sub side members 6, 7 takes the first maximum almost at the same time as the second maximum of the impact load F1 on the side members 2, 3, and thus the magnitude of deceleration in the second stage $P_2$ upon collision can be readily made larger than that in the first stage $P_1$. This makes it feasible to make a decision on the actuation of the airbag device better.

The activation controller for occupant protection apparatus in the present embodiment is provided in the vehicle equipped with the above-stated vehicle front structure and comprises the airbag sensor 15 for detecting the deceleration of vehicle 1, and the determining device 16 for determining the actuation of the airbag device (airbag module 17), based on the deceleration of vehicle 1 detected by the airbag sensor 15. In this activation controller for occupant protection apparatus, the determining device 16 is able to accurately determine the timing of actuation of the airbag device, based on the magnitude of deceleration of vehicle 1 in the second stage $P_2$ detected by the airbag sensor 15.

In the production method of the vehicle front structure in the present embodiment, the location of the sub side members 6, 7 relative to the side members 2, 3 is determined in consideration of the deceleration changes of the side members 2, 3 and the sub side members 6, 7 upon collision so that the timing of the second maximum of deceleration of the side members 2, 3 overlaps with the timing of the first maximum of deceleration of the sub side members 6, 7. Accordingly, it is easy to realize the vehicle front structure in which the magnitude of deceleration in the second stage $P_2$ upon collision of vehicle 1 is greater than that in the first stage $P_1$.

With the vehicle front structure of the present invention, it is feasible to make a decision on the activation of occupant protection apparatus well. With the production method of the vehicle front structure of the present invention, it is feasible to construct the vehicle front structure capable of making a decision on the activation of occupant protection apparatus well. Furthermore, with the activation controller for occupant protection apparatus of the present invention, a decision on activation can be accurately made, so that the activation of the occupant protection apparatus can be accurately controlled. From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A vehicle front structure comprising:
   a pair of side members longitudinally located on right and left sides of a vehicle;
   a pair of sub side members juxtaposed to the respective side members and adapted to receive an impact load in the event of a frontal collision after the side members receive the impact load;
   wherein front ends of the pair of side members are located ahead of front ends of the pair of sub side members;
   wherein the front ends of the pair of side members are located a predetermined distance (c) ahead of the front ends of the pair of sub side members, and
   wherein the predetermined distance (c) is set based on a long-side length (d) and a short-side length (e) in a rectangular section of the side members and a long-side length (f) and a short-side length (g) in a rectangular section of the sub side members; and
   wherein a bumper reinforcement with a longitudinal width (h) is attached to the front ends of the pair of side members and a cross member with a longitudinal width (i) is attached to the front ends of the pair of sub side members, and
   wherein the predetermined distance (c) is represented by Eq (i) below:

$$c = k\left\{\frac{5}{8}(d+e) - \frac{1}{8}(f+g)\right\} - h + i,\ 0.5 \le k \le 2. \quad (i)$$

2. A vehicle front structure comprising:
   a pair of side members longitudinally located on right and left sides of a vehicle;
   a pair of sub side members juxtaposed to the respective side members and adapted to receive an impact load in the event of a frontal collision after the side members receive the impact load;
   wherein a strength ($F_0$) of the side members and a strength ($F_+$) of the sub side members satisfy the following relational expression (ii), using an error range ±a % of deceleration detecting means for detecting the deceleration of the vehicle and a distribution range ±b % of decelerations among different vehicle types against an identical impact load:

$$\frac{F_+}{F_0} \ge \left(1 + \frac{a}{100}\right)^2 \left(1 + \frac{b}{100}\right)^2 - 1. \quad (ii)$$

3. A vehicle front structure comprising:
   a pair of side members longitudinally located on right and left sides of a vehicle;
   a pair of sub side members juxtaposed to the respective side members and adapted to receive an impact load in the event of a frontal collision after the side members receive the impact load;

wherein a location of front ends of the pair of sub side members relative to a location of front ends of the pair of side members is determined so that a time of occurrence of a second maximum of the vehicle deceleration generated by only the pair of side members in the event of the collision substantially coincides with a time of occurrence of a first maximum of the vehicle deceleration generated by only the pair of sub side members in the event of the collision.

4. The vehicle front structure according to any one of claims 1 to 3, wherein the sub side members are located below the side members.

5. The vehicle front structure according to any one of claims 1 to 3, wherein a bumper reinforcement placed along a transverse direction of the vehicle is attached to front ends of the pair of side members and wherein a cross member placed along the transverse direction of the vehicle is attached to front ends of the pair of sub side members.

6. The vehicle front structure according to any one of claims 1 to 3, wherein the vehicle has a sub frame, the sub frame being fixed to the pair of side members, and wherein the pair of sub side members extend from the sub frame.

7. The vehicle front structure according to any one of claims 1 to 3, wherein each sub side member is supported by a support member extending downward from the each side member.

8. The vehicle front structure according to one of claim 7, wherein a portion going into contact with an obstacle upon a collision of the pair of sub side members is located ahead of the support member.

9. The vehicle front structure according to claim 2 or 3, wherein front ends of the pair of side members are located ahead of front ends of the pair of sub side members.

10. The vehicle front structure according to claim 9, wherein the front ends of the pair of side members are located a predetermined distance (c) ahead of the front ends of the pair of sub side members, and
   wherein the predetermined distance (c) is set based on a long-side length (d) and a short-side length (e) in a rectangular section of the side members and a long-side length (f) and a short-side length (g) in a rectangular section of the sub side members.

* * * * *

UNITED STATES PATENT AND TRADEMARK OFFICE
CERTIFICATE OF CORRECTION

PATENT NO. : 7,025,410 B2 Page 1 of 1
APPLICATION NO. : 10/838260
DATED : April 11, 2006
INVENTOR(S) : Naoya Kosaka It is certified that error appears in the above-identified patent and that said Letters Patent is hereby corrected as shown below:

Claim 8, col. 14, line 5, delete "one of"

Signed and Sealed this

Third Day of April, 2007

JON W. DUDAS
*Director of the United States Patent and Trademark Office*